(12) United States Patent
Bradburn

(10) Patent No.: US 8,774,756 B2
(45) Date of Patent: Jul. 8, 2014

(54) DEVICES AND METHODS FOR SIGNAL SHARING

(75) Inventor: John K Bradburn, Carmel, IN (US)

(73) Assignee: John K Bradburn, Indianapolis, IN (US)

( * ) Notice: Subject to any disclaimer, the term of this patent is extended or adjusted under 35 U.S.C. 154(b) by 0 days.

(21) Appl. No.: 13/526,955

(22) Filed: Jun. 19, 2012

(65) Prior Publication Data

US 2013/0095786 A1    Apr. 18, 2013

Related U.S. Application Data

(60) Provisional application No. 61/504,216, filed on Jul. 3, 2011.

(51) Int. Cl.
*H04M 11/00* (2006.01)

(52) U.S. Cl.
USPC .......................................................... 455/406

(58) Field of Classification Search
USPC ........ 455/428, 422.1, 11.1, 7, 90.3, 406, 410; 370/241, 252, 312, 329, 328; 380/282; 340/932.2; 705/1.1, 37
See application file for complete search history.

(56) References Cited

U.S. PATENT DOCUMENTS

| | | | |
|---|---|---|---|
| 2006/0104232 A1* | 5/2006 | Gidwani | 370/328 |
| 2006/0218621 A1* | 9/2006 | Covington et al. | 726/1 |
| 2007/0072604 A1* | 3/2007 | Wang | 455/428 |
| 2010/0214930 A1* | 8/2010 | Hu et al. | 370/241 |

* cited by examiner

*Primary Examiner* — Kiet Doan
(74) *Attorney, Agent, or Firm* — Woodard, Emhardt, Moriarty, McNett & Henry LLP

(57) ABSTRACT

Among other things, there is disclosed systems, methods and apparatus for sharing and/or expanding the reach of wireless communications signals. For example, where a first communication device is unable to obtain a sufficient communication signal from a transmission source, and a second communication device can obtain a sufficient signal, the second device may be used as a relay between the transmission source and the first device.

19 Claims, 3 Drawing Sheets

DEVICES AND METHODS FOR SIGNAL SHARING

CROSS-REFERENCE TO RELATED APPLICATIONS

The present application claims the benefit of U.S. Provisional Application No. 61/504,216, filed Jul. 3, 2011, confirmation number 3449.

FIELD

The present disclosure relates to devices and methods for signal sharing, for example, to change or enhance signal transmission by or to communication devices and/or transmission sources. Examples of devices with which the disclosure may be used include wireless, cellular, mobile, and/or computer devices.

BACKGROUND

Traditional communication devices require a signal to be processed through a transmission source of a transmission system. Systems such as the Global System for Mobile Communications (GSM), or those using multiple access techniques such as TDMA (time division), CDMA (code division), and FDMA (frequency division), use multiplexing techniques to combine multiple analog or digital signals. They require a transmission source, such as a cellular tower or wi-fi network, to transfer signals (e.g. voice and/or data) to and from a particular telephone, computer or other communication device. The increased usage of mobile devices and bandwidth is known to place a strain on existing systems. Voice and data coverage may also be impeded in urban areas, for example by large glass, concrete and steel structures, or in rural areas, for example resulting from long distances from a transmission source. As such, there is a need for apparatuses and methods for enhancing the ability to transmit and receive signals in such areas by communication devices.

The signal strength received by a communication device may be a function of a number of factors including the magnitude of the transmission field (e.g. the power behind transmissions at the transmission source) and the distance from the transmission source. Weak signal strength (as observed at a particular communication device) may be caused by distance, interference or other factors which degrade, alter, or disrupt signal transmission to an end user. Interference may include electromagnetic interference, co-channel or cross talk, cell breathing or reduction in signal-to-noise ratio, which may degrade the signal or make the signal difficult to recognize. An alternate approach to reduce disruption of voice and data transmission is desirable.

SUMMARY

Typical systems that require signal transmission through a transmission tower may benefit from or be replaced by alternate approaches. There is a need for an apparatus and method for direct signal sharing between communications devices, which may not be dependent on a tower or base transmission source. With the expanded coverage provided by signal sharing, fewer towers and base-stations may be required by using the embodiments disclosed herein. Additionally, in the event of natural or man-made disasters, the embodiments herein may handle signal usage spikes at a time when the disaster takes out or overloads existing tower based infrastructures. Embodiments herein may allow emergency communications to persist despite tower outages.

Among other things, there are disclosed systems, apparatus and methods for mobile communication including a first mobile communication device adapted for sending messages from and receiving messages for a user wirelessly, a fixed transmission source that is part of a wireless communication network, and a second mobile communication device adapted to conduct messages as a relay between the source and the first mobile communication device. Messages are transmitted between the first mobile communication device and the fixed transmission source via the second mobile communication device.

Particular embodiments may include one or more of a number of features. For example, the first and second mobile communication devices are each mobile telephones in certain embodiments. The second mobile communication device can have an open communication channel with the fixed transmission source through acceptance of a system identification code, with the first mobile communication device having an open communication channel with the second mobile communication device through acceptance of a second system identification code that is the same as the first system identification code. Frequencies of transmission between the second mobile communication device and the fixed transmission source and between the first mobile communication device and the second mobile communication device are the same in particular examples, and in others messages conducted from the fixed transmission source to the first mobile communication device via the second mobile communication device are not readable to a user of the second mobile communication device. At least the second mobile communication device in some embodiments has a pathway for receiving communications intended for the second mobile communication device only and a separate pathway for receiving signals for relay to the first mobile communication device. The separate pathway can include at least one of an antenna and a transmitter for relaying signals to the first mobile communication device, and/or at least one separate software processing routine for relaying signals to the first mobile communication device.

In certain examples, the second mobile communication device includes software for allowing a user of the second mobile communication device to enable or disable ability of the second mobile communication device to relay signals between the first mobile communication device and the fixed transmission source. A third mobile communication device adapted to conduct messages as a relay between the second mobile communication device and one of the first mobile communication device and the fixed transmission source can be provided. Relay devices (e.g. the second mobile communication device noted above) may include firewall software to prevent them from reading messages conducted between the first mobile communication device and the fixed transmission source. A second mobile communication device may have excess signal transmission capacity, which excess capacity is used by the first mobile communication device. Specific examples of fixed transmission sources are one or more towers (e.g. a tower in a mobile telephone network) and one or more satellites (e.g. geo-synchronous satellites in a communications network).

Methods for wireless communication in a network including a transmission source, a first mobile communication device and a second mobile communication device are also discussed. Such methods can include one or more of establishing a communications channel between the first mobile communication device and the second mobile communication device, and establishing a communications channel between the second mobile communication device and the transmission source; sending a message between the transmission source and the first mobile communication device by way of the second mobile communication device as a conduit; and accruing a premium to the second mobile communication device reflecting the use of the second mobile communication device as a conduit for the message.

Particular embodiments can include sending a request from the first mobile communication device to a network within which the transmission source operates, and determining that a sufficient signal for communications between the first mobile communication device and a transmission source for the network is not available. The request can come prior to establishing a communications channel between the first mobile communication device and the second mobile communication device. In some cases, the first and second mobile communication devices are mobile telephones. The premium may be at least partly a cash-representative premium and/or at least partly a time- or usage-representative premium. The establishing steps noted previously can each use the same system identification code to establish the respective communications channels. Further steps can include preventing messages conducted from the fixed transmission source to the first mobile communication device via the second mobile communication device from being readable to a user of the second mobile communication device, and/or entering a signal to enable or disable ability of the second mobile communication device to relay signals between the first mobile communication device and the fixed transmission source. Examples of transmission sources, as noted above, are tower(s) or satellite(s) in a mobile telephone or other communications network.

Methods for wireless communication disclosed herein can also include one or more of receiving a request from a first mobile communication device to a network for a channel or network connection; determining at one or both of the first mobile communication device and a transmission base or source whether a sufficient signal for satisfactory communication between the first mobile communication device and the transmission base or source exists; if the sufficient signal exists, then sending one or more messages between the first mobile communication device and the transmission base or source; if the sufficient signal does not exist, then locating a second mobile communication device having an open channel to the network or transmission base or source and establishing a connection between the first mobile communication device and the second mobile communication device, and transmitting one or more messages between the network or transmission base or source and the first mobile communication device via the second mobile communication device, the second mobile communication device being only or at least a conduit for the one or more messages.

Thus, systems for signal sharing with a first device (e.g. a cellular phone) configured to utilize a signal and a second device configured to share the signal with the first device and connect to a signal tower or base station are provided, wherein the first device shares the signal from the second device to share the signal. Methods for signal sharing can include receiving a signal from a source by a first device, transmitting at least a portion of the signal from the first device to a second device, and receiving at least a portion of the signal by the second device without directly connecting to the source.

BRIEF DESCRIPTION OF THE DRAWINGS

A more complete understanding of the present embodiments, and some of the attendant advantages and features thereof, will be more readily understood by reference to the following detailed description when considered in conjunction with the accompanying drawings wherein.

DETAILED DESCRIPTION

Figure 1:
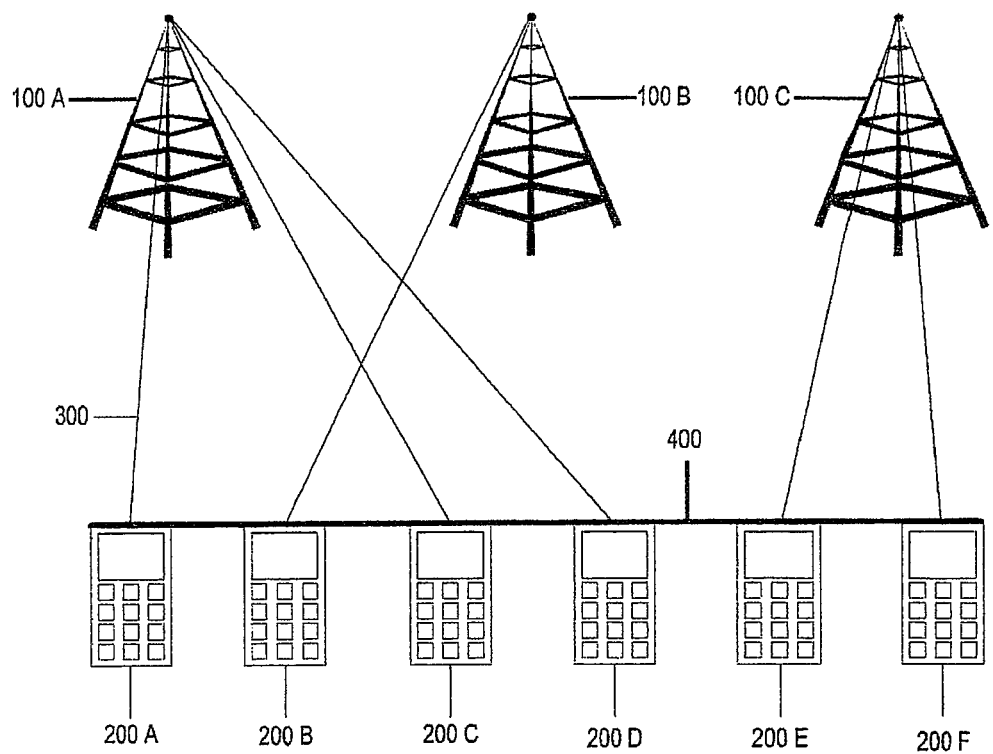
FIG. 1 illustrates an embodiment of the present disclosure including one or more communication devices and transmission sources.

To promote an understanding of the principles of the disclosure, reference will now be made to certain embodiments and specific language will be used to describe the same. It will nevertheless be understood that no limitation of the scope of the claims is thereby intended, such alterations and further modifications of the disclosed methods and/or devices, and such further applications of the principles of the disclosure as described herein, being contemplated as would normally occur to one skilled in the art to which the disclosure relates.

Embodiments of the present disclosure may include a communication device that can share a signal with or use a signal from one or more other communication devices (also referred to as "device") and/or transmission sources (also referred to as "source"). Embodiments of communication devices as discussed herein are or include one or more wireless, cellular, mobile, tablet or computer devices, devices otherwise configured to transmit or receive a voice, data or other signal, or combinations thereof. A signal (as used herein) may be or include (or be configured to include or embody) analog and/or digital signals carrying voice, data or other information, such as wi-fi or wi-max, IEEE 802.11, bluetooth, radio frequency, electromagnetic, spectrum energy, or other types of wireless transmission, or any combination thereof. Embodiments herein include dual-mode and/or multiple-mode devices capable of transmitting and/or receiving signals according to two or more standards, for example both GSM and CDMA. Embodiments may be configured to measure signal strength from a transmission source or station, for example, a transmission tower, cell tower, satellite, base station, or power station.

The discussion below specifically refers to mobile telephones as a particular examples of mobile communication devices, for clarity and ease of description. When a phone is turned on, it seeks out a network for connection, as by providing or seeking a System Identification Code (SID) from a given service provider on a control channel or frequency. When the phone does not link with a network via the control channel and SID, then the phone shows the user that it is out of range or otherwise has insufficient signal strength for sending and/or receiving messages. If an SID is sent or exchanged, then the phone links with the network. The mobile telephone switching office (MTSO) for that carrier identifies where that phone is, and what transmission frequencies are available for that phone.

That frequency assignment between a phone and a transmission source could be used by another, separate telephone, e.g. one having the same SID as the phone with the frequency assignment with a transmission source, but which would show a no-service, out-of-service-area, or roaming indication (i.e. an insufficient signal for a particular network) due to distance, obstructions, or other weak signal issues. That is, for a first mobile telephone that has an insufficient signal from its network and a second mobile telephone that has connected with and has a frequency assignment from a network, the first mobile phone connects with the second mobile phone and uses the frequency assignment of the second to send and/or receive messages (voice, data or otherwise) to or from a transmission source (e.g. network station or tower). Because each of those first and second phones can search out either another device as well as the MTSO, the first phone (e.g. one not within the MTSO's control) with an SID recognizable by the second phone can use that second phone as a relay to the MTSO. Both phones have low power radio capabilities built-in, including transmitters and antennas, thus extending the carrier's reach significantly without interfering with another cell.

As the signal strength of a phone (e.g. the first phone noted above with poor or no signal) is improving with respect to a base station (or other example of a transmission source or station), the base station releases the second mobile phone from its relay function and/or from providing base station radio functions, and moves the first phone's signal directly to its control, or perhaps to the control of a better transmission source or other mobile device, i.e. one that has a better or stronger signal for the first phone. The second phone no longer needs to function as a relay to the MTSO. In the event of a catastrophic MTSO failure, the phones and available stations, towers or other sources are able in particular embodiments to select a frequency to assign independently, so as to maintain communication on the network.

The methods and configurations disclosed would operate in the same or a similar fashion in a system having satellite-to-ground-station controllers and devices (e.g. phones) linked to a system of ground controllers and switching offices.

In various embodiments, signals may be transferred between combination(s) of devices and/or sources, both in terms of numbers and in terms of types. For example, in certain embodiments more than one relay phone (as indicated above) may be used between a user's phone and a transmission source. Particular embodiments may use one or more mobile devices other than phones as relay(s) between a user's phone and a transmission source. In addition to acting as a relay, devices may be configured to measure, identify, and notify a transmission source and/or a communication device of preferable signal strength and/or proximity of source(s) and/or device(s).

In embodiments of methods, a communication device (e.g. mobile phone) and/or transmission source (e.g. MTSO, base station or tower) may measure and/or obtain a signal from another device and/or source. The signal may be transmitted between any combination of devices and/or sources. Devices and/or sources may include a transmitter, and/or be configured to emit one or more signals. Devices and/or sources may have an antenna, configured to receive the signal from one or more devices and/or sources, and to identify multiple System Identification Codes assigned to carriers by the FCC.

When a user activates his or her mobile phone or other device, it will indicate a signal strength (or no signal) available to the device. If one or more other devices have a clearer or stronger signal than the user's device, the user's device may obtain a signal of or from such other device(s). The other device(s) relay signals (e.g. voice and data transmissions) between source(s) and device(s) (or combination(s) of them), which can include signal sharing from device to device. Also, system embodiments may be configured to select a transmission route for signals based on measured signal strength between given devices and/or sources, and to transfer the signal from source to source. Firewall software can be incorporated into passive device(s) being used as a relay by another device to link to the MTSO. The relay device sharing the base station's signal would have no way to intercept the phone or data communication (i.e. for access by the user of the relay device), unless that second (relay) device is the object of the first device's communication, e.g. as by recognizing that first device's mobile identification number.

Embodiments may include one or more first devices (out-of-range or insufficient-signal devices) utilizing the signal from one or more second devices (relays or sufficient-signal devices). The first device may utilize the signal of the second device, creating a network of discrete sources (e.g. from each of separate sufficient-signal devices) and/or a preferable signal strength. For example, where a relay device has excess capacity or its usage is reduced, a first device with insufficient signal can use the former's excess signal transmission capacity. As another example, if the first device requires additional signal, the first device may utilize the signal of the second device. Additionally, first device may utilize the second device to link to a source and/or directly to another device that may be linked to a source. The first device may utilize the signal capabilities of the second device without directly connecting with a source or violating a firewall. The MTSO may determine that no calls need go through a base station, that each series of devices may be more suitable to serve as its own base station network of low power radio transmissions controlled by the MTSO.

Embodiments may utilize moving or stationary devices, for example, mobile devices in vehicles. Devices, moving and stationary, may enhance the speed and/or coverage other devices. Also, network signal utilization may be shared between carriers or maintained as a proprietary network of shared signal relays.

In the case of wireless local area networks, or WiFi, utilizing radio waves over a computer network, generally adhering to the Institute of Electrical and Electronic Engineers 802.11 standards this concept is also applicable. Each WiFi device can serve as a network extender or repeater, thus magnifying the infrastructure of the network. This would be particularly useful in public networks, limited area networks, or "thin" access points. A device's access to a network by way of another wifi device acting as repeater, could also serve as a repeater for other devices, as well as connect to a stronger network thereby linking the two networks in optimal multiple signal utilization.

Figure 2:
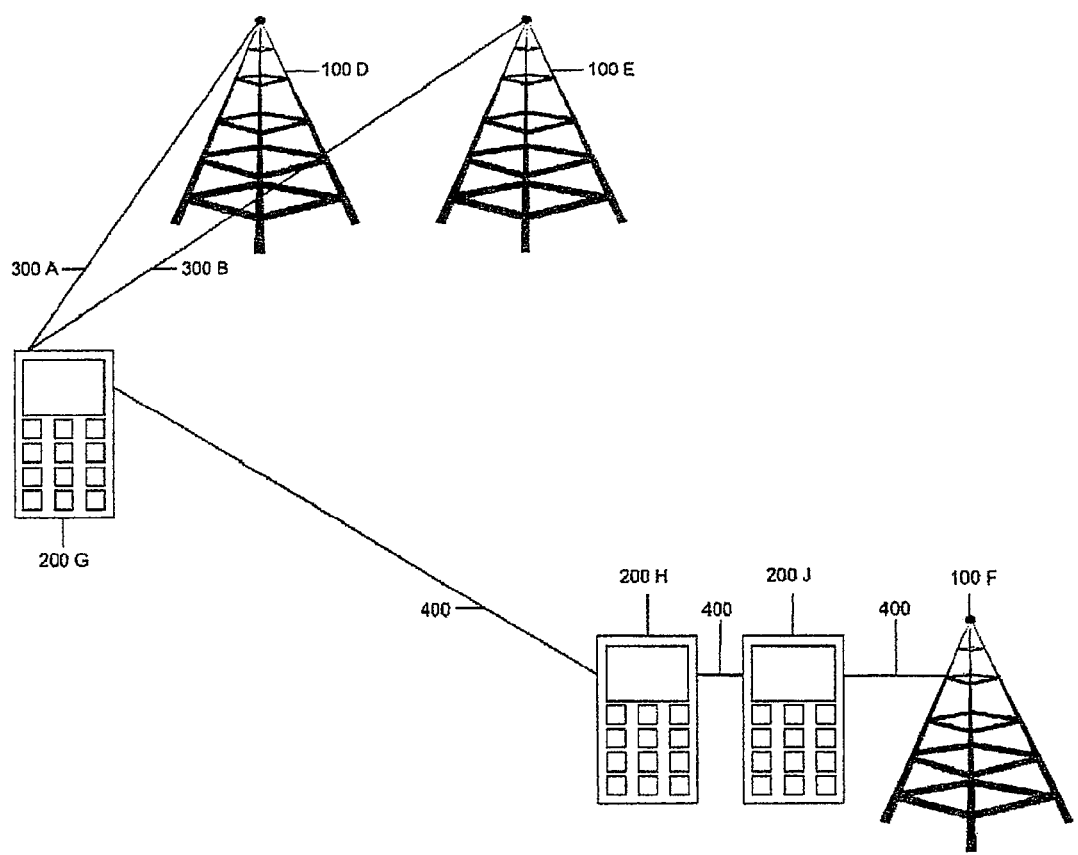
FIG. 2 illustrates an embodiment of the present disclosure including one or more transmission sources linked through communication device(s).

Referring to FIGS. 1 and 2, examples of systems and the devices in them according to the present disclosure are shown. As above, mobile telephones are given as examples of communication devices, and cell towers are shown as examples of transmission stations or sources. It will be understood that other types of devices and sources as noted above can be used in other examples.

In FIG. 1, three separate sources in the form of cell towers 100A, 100B, and 100C are shown, each having a separate physical location as may be appropriate in at mobile telephone network. Sources 100A, 100B, 100C may be controlled or associated with the same or different MTSOs. A number of mobile phones 200A-F are also shown. Each tower 100 is a source of transmissions 300 to one or more of phones 200. For example, tower 100A in FIG. 1 sends signals 300 to and receives them from phones 200A, 200C, 200D. Tower 100B corresponds with (sends and receives signals 300 to and from) phone 200B, and tower 100C corresponds with phones 200E and 200F. As noted above, phones 200 are mobile, while towers 100 are fixed sources, so that phones 200 may move into or out of signal coverage with respect to each of towers 100.

Each of phones 200A-F are configured with transmitter and antenna structure (as indicated above) to permit them to send signals 400 to other(s) of phones 200A-F, in addition to hardware for communicating with sources 100. Handling of signal 400 may be accomplished by software in each phone 200 (i.e. using the same transmitter, antenna and other hardware used for signals 300, separated by firewall and/or other software), or by inclusion of separate hardware for signal 400, or by a combination of both software and hardware. Whether by software or hardware, separate pathway(s) for signal 400 may be provided so that usage of a phone for signals 300 and 400 may be independent of each other. As noted previously, phones 200 are loaded with firewall software in particular embodiments, so that when a phone 200 is used as a relay (i.e. for signal 400), its other functions are not affected, and it cannot access the substance of a relayed message or transmission. Phones 200 include software for monitoring its usage as a relay by other phones 200, in particular embodiments. The usage can be monitored in terms of time (e.g. the amount of time the particular phone 200 is used as a relay), in terms of money (e.g. a cost or charge to be assessed to another phone or to be credited to the relay phone for its use as a relay), in terms of bandwidth or throughput used (e.g. megabytes of data), or other factors.

Thus, mobile phones 200 or other devices may be piggybacked on the transmission capabilities of other phones 200 (or other devices). Lower bandwidth voice and text may be preferred, but any signal may be relayed via the transmission capabilities of other device(s). The relayed signal is used as a supplement or replacement for a signal from a source (e.g. tower(s) 100).

Signal 300 may be transmitted between a source 100 and one or more devices 200, and signal 400 may be transmitted between one or more devices 200. For example, a signal 300 (representing a phone call, for example) may be transmitted between source 100A and phone 200A, which in an example is within sufficient signal strength or coverage area associated with tower 100A. Signal 400 may be transmitted from phone 200A (with the substance of the exemplary phone call) to any of phones 200B-F that are within range of phone 200A. As a further example, a signal 300 (e.g., representing data) may be transferred between tower 100B and phone 200B (within tower 100B's coverage area), and signal 400 is transferred between or among phone 200B and other phone(s) 200 that may not have the necessary signal strength directly from tower 100B. That is, source(s) 100 and/or device(s) 200 are configured to receive or transmit signals 300 or 400 to other source(s) 100 or device(s) 200 to allow signal sharing. Messages transmitted from a phone 200 to another phone 200 via tower 100 (e.g. a signal 300 from phone 200A to tower 100A, and a signal 300 from tower 100A to phone 300C) can also be accomplished.

In the embodiment of FIG. 2, signals 300 are shown transmitted between a device 200 and multiple sources 100. That example shows signal 300A transmitted between (to or from) device 200G and source 100D, and signal 300B between (to or from) source 100E. Thus, this example has a particular phone 200G in good range of two sources 100D and 100E. It will be understood that phone 200G may be in range of only one tower 100. Communication of signals to other phones 200 (e.g. to or from towers 100D, 100E through or via phone 200G) is possible. Signal 400 may be transmitted between phone 200G and phone 200H (a device out of range of or having poor signal strength from towers 100D and 100E). The example of FIG. 2 shows a further connection between phones 200H and 200J. Signal 400 may be transmitted between devices 200H and 200J, which may then be transmitted between device 200J and another source 100F, e.g. for connection to other towers, land lines, networks, etc. Source 100 and/or device 200 are thus configured to receive or transmit signal 300 from/to source 100 and device 200 in an exemplary embodiment.

Figure 3:
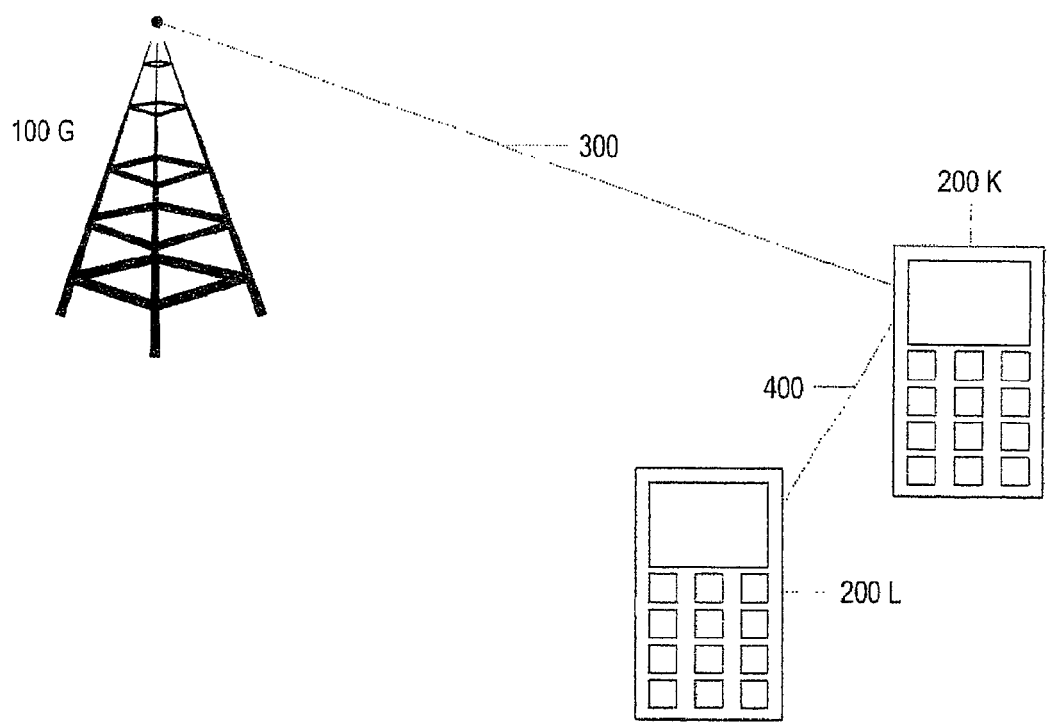
FIG. 3 illustrates an embodiment of the present disclosure including a communication device linked to a transmission source through a communication device.

A particular example is shown in FIG. 3. In that figure, phone 200L uses phone 200K as a relay to and from tower 100G. Signals 300 to and/or from tower 100G are received and passed (as signals 400) by phone 200K to and/or from phone 200L. For example, where phone 200L is in a setting where signal is weak or substantially absent, as in rural areas with signal loss due to distance from sources or in urban areas with signal loss due to physical architectural barriers), its transmissions are completed without direct link to or use of tower 100G, using a stronger signal 300 (from phone 200K to tower 100G) until tower 100G or another source becomes more optimal for signal strength to phone 200L. As another example, a person may be in an interior of a building and may relay on the signal of a person outside who has better signal strength because there are fewer physical obstructions to a tower. Thus, signal 400 may be transmitted to phone 200 without tower 100. For example, device 200L may receive signal 400 from device 200K without communicating with source 100G. Device 200K may receive signal 300 from source 100G, but device 200L may receive signal 400 without communicating with source 100G and/or signal 300.

Embodiments may be utilized with satellite-to-ground transmission networks, as noted above. Devices in a satellite network may allow signal sharing with towers or other devices without requiring satellite connection. For example, devices of a satellite system may use signal sharing as a supplement to satellite connection or as a replacement if a satellite signal is unavailable or less desirable. Devices may use their primary network or another network. As another example, devices may use signal sharing multiplexing or bypass the satellite system tower system completely with a ground-based tower signal sharing, or signal sharing with other devices.

Embodiments may also be utilized as an autonomous network, independent of other's base-stations, towers, and satellite retransmission facilities. For such embodiments, sufficient numbers of individual devices in a regional or global network may be necessary for the signals to provide adequate coverage. Such clusters of devices would assure system reliability, or if necessary, license capacity from selected carriers.

Embodiments may include software and/or other methods for charging a relay-user and/or crediting a relay-provider for such usage in an enhanced or shared signal environment, so as to encourage users of devices, for example, cell or mobile phones, tablets, netbooks, laptops and other communication devices. As noted above, such charges or credits may be made in a time, usage, cash-representative or other format. Also, devices may be utilized for retransmission purposes.

In an embodiment, cellular or other voice and data carriers may incentivize users of their network to make additional capacity available. For example, the carriers or a third-party may charge a fee for net bandwidth utilization. If an owner of a device agrees to permit his device to be used for the retransmission of the carrier's signal, then the device owner would receive a credit of bandwidth usage to be used to reduce the user's bandwidth fee or receive a credit of additional bandwidth. The carrier may determine, using market or competitive data, the amount of credit given off the standard charge for bandwidth saved by relaying signals.

In another embodiment, a service fee, credit, and/or discount may be determined by a ratio between retransmission and usage. For example, a retransmission ratio of 1:1, meaning the user's device was used to retransmit the same amount of bandwidth used, may receive a discount on the monthly rate. As another example, a ratio of 2:1, meaning the device was used to retransmit twice as much as the bandwidth used, may receive a higher discount. However, a ratio of 1:2, half the retransmission compared to the amount of bandwidth used, may receive a no discount or an increased service fee. The user's ratio between retransmission and bandwidth usage may be shared with the source and/or other devices.

While the disclosure has been illustrated and described in detail in the drawings and foregoing description, the same is to be considered as illustrative and not restrictive in character, it being understood that only the most preferred embodiments have been shown and described, and that all changes and modifications that come within the spirit of the disclosure are desired to be protected. Features or aspects discussed in connection or in the context of one embodiment or part may be used with or incorporated into other embodiments, parts or aspects of this disclosure. In addition, all publications cited herein are indicative of the abilities of those of ordinary skill in the art and are hereby incorporated by reference in their entirety as if individually incorporated by reference and fully set forth.

What is claimed is:

1. A system for mobile communication, comprising:
   a first mobile communication device adapted for sending messages from and receiving messages for a user wirelessly;
   a fixed transmission source that is part of a wireless communication network; and
   a second mobile communication device adapted to conduct messages as a relay between the source and the first mobile communication device,
   wherein messages are transmitted between the first mobile communication device and the fixed transmission source via the second mobile communication device,
   wherein the second mobile communication device has an open communication channel with the fixed transmission source through acceptance of a system identification code, and wherein the first mobile communication device has an open communication channel with the second mobile communication device through acceptance of a second system identification code that is the same as the first system identification code, and
   wherein messages conducted from the fixed transmission source to the first mobile communication device via the second mobile communication device are not readable to a user of the second mobile communication device.

2. The system of claim 1, wherein the first and second mobile communication devices are each mobile telephones.

3. The system of claim 1, wherein messages conducted from the fixed transmission source to the first mobile communication device via the second mobile communication device are not readable to a user of the second mobile communication device.

4. The system of claim 1, wherein at least the second mobile communication device has a pathway for receiving communications intended for the second mobile communication device only and a separate pathway for receiving signals for relay to the first mobile communication device.

5. The system of claim 4, wherein the separate pathway includes at least one of an antenna and a transmitter for relaying signals to the first mobile communication device.

6. The system of claim 4, wherein the separate pathway includes at least one separate software processing routine for relaying signals to the first mobile communication device.

7. The system of claim 1, wherein the second mobile communication device includes software for allowing a user of the second mobile communication device to enable or disable ability of the second mobile communication device to relay signals between the first mobile communication device and the fixed transmission source.

8. The system of claim 1, further comprising a third mobile communication device adapted to conduct messages as a relay between the second mobile communication device and one of the first mobile communication device and the fixed transmission source.

9. The system of claim 1, wherein the second mobile communication device has excess signal transmission capacity, which excess capacity is used by the first mobile communication device.

10. The system of claim 1, wherein the fixed transmission source is a tower in a mobile telephone network.

11. The system of claim 1, wherein the fixed transmission source is a satellite.

12. A method for wireless communication in a network including a transmission source, a first mobile communication device and a second mobile communication device, comprising:
   (a) sending a request from the first mobile communication device to a network within which the transmission source operates, and determining that a sufficient signal for communications between the first mobile communication device and a transmission source for the network is not available;
   (b) following step (a), establishing a communications channel between the first mobile communication device and the second mobile communication device;
   (c) establishing a communications channel between the second mobile communication device and the transmission source;
   (d) sending a message between the transmission source and the first mobile communication device by way of the second mobile communication device as a conduit;
   (e) accruing a premium to the second mobile communication device reflecting the use of the second mobile communication device as a conduit for the message; and
   (f) preventing messages conducted from the fixed transmission source to the first mobile communication device via the second mobile communication device from being readable to a user of the second mobile communication device.

13. The method of claim 12, wherein the first and second mobile communication devices are mobile telephones.

14. The method of claim 12, wherein the premium is at least partly a cash-representative premium.

15. The method of claim 12, wherein the premium is at least partly a usage-representative premium.

16. The method of claim 12, wherein steps (a) and (b) each use the same system identification code to establish the respective communications channels.

17. The method of claim 12, further comprising entering a signal to enable or disable ability of the second mobile communication device to relay signals between the first mobile communication device and the fixed transmission source.

18. The method of claim 12, wherein the transmission source includes a tower in a mobile telephone network.

19. The method of claim 12, wherein the transmission source includes a satellite.

* * * * *